US011075775B2

(12) United States Patent
Gould et al.

(10) Patent No.: US 11,075,775 B2
(45) Date of Patent: Jul. 27, 2021

(54) HOME AUTOMATION SYSTEM INCLUDING CLOUD SERVER BASED MAINTENANCE OPERATION COMMUNICATION AND RELATED METHODS

(71) Applicant: K4CONNECT INC., Raleigh, NC (US)

(72) Inventors: Jonathan Andrew Gould, Raleigh, NC (US); Mark Robert Adams, Raleigh, NC (US)

(73) Assignee: K4CONNECT INC., Raleigh, NC (US)

( * ) Notice: Subject to any disclaimer, the term of this patent is extended or adjusted under 35 U.S.C. 154(b) by 22 days.

(21) Appl. No.: 16/176,261

(22) Filed: Oct. 31, 2018

(65) Prior Publication Data

US 2019/0190740 A1  Jun. 20, 2019

Related U.S. Application Data

(60) Provisional application No. 62/599,858, filed on Dec. 18, 2017.

(51) Int. Cl.
*H04L 12/24* (2006.01)
*H04L 12/28* (2006.01)

(52) U.S. Cl.
CPC ...... *H04L 12/2807* (2013.01); *H04L 12/2814* (2013.01); *H04L 12/2832* (2013.01); *H04L 41/046* (2013.01); *H04L 41/082* (2013.01); *H04L 41/084* (2013.01); *H04L 41/22* (2013.01); *H04L 2012/2841* (2013.01)

(58) Field of Classification Search
None
See application file for complete search history.

(56) References Cited

U.S. PATENT DOCUMENTS

| | | | |
|---|---|---|---|
| 2007/0143440 A1* | 6/2007 | Reckamp | H04L 12/2834 709/217 |
| 2017/0006051 A1* | 1/2017 | Gould | H04L 63/1425 |
| 2017/0006533 A1 | 1/2017 | Gould et al. | |
| 2017/0034023 A1* | 2/2017 | Nickolov | H04L 43/0817 |
| 2017/0171090 A1 | 6/2017 | Britt et al. | |
| 2017/0294090 A1 | 10/2017 | Sentosa et al. | |
| 2018/0218123 A1* | 8/2018 | Gomez Sanchez | G16H 40/63 |

OTHER PUBLICATIONS

Patrick Moorhead, The Problem With Home Automation's Internet of Things (IoT), Forbes, Sep. 26, 2013.

* cited by examiner

*Primary Examiner* — Willie J Daniel, Jr.
(74) *Attorney, Agent, or Firm* — Allen, Dyer, Doppelt + Gilchrist, P.A.

(57) ABSTRACT

A home automation (HA) system may include HA operation devices and HA user interface devices for respective users. Each HA user interface device may be configured to wirelessly communicate with at least one of the HA operation devices. The HA system may also include HA hub devices configured to provide communications for the HA user interface devices and the HA operation devices. A cloud server may be configured to communicate with the HA hub devices, determine a needed maintenance operation for a given one of the HA operation devices, and communicate the needed maintenance operation to the given one of the HA operation devices. The cloud server may also be configured to duplicate communicating the needed maintenance operation to others of the HA operation devices.

22 Claims, 5 Drawing Sheets

HOME AUTOMATION SYSTEM INCLUDING CLOUD SERVER BASED MAINTENANCE OPERATION COMMUNICATION AND RELATED METHODS

RELATED APPLICATION

The present application is based upon provisional application Ser. No. 62/599,858, filed Dec. 18, 2017, the entire contents of which is hereby incorporated by reference.

TECHNICAL FIELD

The present embodiments are directed to the field of electronics, and more particularly to home automation systems and related methods.

BACKGROUND

There are a number of home automation systems and approaches that seek to permit automated control of electrical devices in a house. The popularity of home automation has been increasing due to the greater availability of smartphones and tablets. As noted in "The Problem With Home Automation's Internet Of Things (IoT)", an article appearing in Forbes dated Sep. 26, 2013, home automation was typically for wealthy consumers with an expensive system to control lights, home theater, security, air conditioning, and home audio. This market has expanded with many do it yourself (DIY) products now available, and, although the products are useful, they may be difficult to aggregate. In other words, as explained in the article, difficulties could arise if a consumer bought a Nest thermostat, Kwikset door lock, Phillips Hue lighting device, Lutron light switch, Sonos audio system, and Belkin wireless plugs. The consumer would need to have multiple applications each requiring time to setup, learn, and use. Additionally, the article states that there is no easy way to make devices work together, such as if the consumer wanted to trigger one event using one device based on another event from another device.

Multiple communication protocols may also be problematic. In particular, different devices may operate using different communication protocols, for example, Wifi, Zigbee, Zwave, Insteon, Itron, RadioRA2, and others. This may create additional difficulties for home automation.

One approach to address these shortcomings is for the consumer, which may include a user and/or enterprise, to use a service and device aggregator that provides one application and a consolidated wireless adapter unit. The user would contract with such a provider for multiple years. Unfortunately, as noted in the article, the consumer may not benefit from the most advanced hardware and software.

Another approach, as noted in the Forbes article, is to provide a single application that attempts to consolidate disparate applications and consolidate wireless adaptors, for example, using each of the different communications protocols. Still further improvements to the operation and integration of devices may be desirable.

SUMMARY

A home automation (HA) system may include a plurality of HA operation devices and a plurality of HA user interface devices for respective users. Each HA user interface device may be configured to wirelessly communicate with at least one of the plurality of HA operation devices. The HA system may also include a plurality of HA hub devices configured to provide communications for the plurality of HA user interface devices and the plurality of HA operation devices. A cloud server may be configured to communicate with the plurality of HA hub devices and determine a needed maintenance operation for a given one of the plurality of HA operation devices. The cloud server may also communicate the needed maintenance operation to the given one of the plurality of HA operation devices and duplicate communicating the needed maintenance operation to others of the plurality of HA operation devices.

The needed maintenance operation may include a repair operation, for example. The needed maintenance operation may include an upgrade operation.

The cloud server may be configured to communicate the needed maintenance operation to the given one of the plurality of HA operation devices by way of a corresponding one of the plurality of HA hub devices, for example. The cloud server may be configured to duplicate communicating the needed maintenance operation to others of the plurality of HA operation devices by way of respective ones of the plurality of HA hub devices.

The plurality of HA operation devices, the plurality of HA user interface devices, and the plurality of HA hub devices may be within a structure. The structure may include a senior living facility.

A method aspect is directed to a method of communicating a needed maintenance operation in an HA system that includes a plurality of HA operation devices, a plurality of HA user interface devices for respective users, each HA user interface device configured to wirelessly communicate with at least one of the plurality of HA operation devices, and a plurality of HA hub devices configured to provide communications for the plurality of HA user interface devices and the plurality of HA operation devices. The method may include using a cloud server to communicate with the plurality of HA hub devices and determine a needed maintenance operation for a given one of the plurality of HA operation devices. The cloud server may also be used to communicate the needed maintenance operation to the given one of the plurality of HA operation devices and duplicate communicating the needed maintenance operation to others of the plurality of HA operation devices.

Another aspect is directed to a home automation (HA) system that may include a plurality of HA operation devices and a plurality of HA user interface devices for respective users. Each HA user interface device may be configured to wirelessly communicate with at least one of the plurality of HA operation devices. The HA system may also include a plurality of HA hub devices configured to provide communications for the plurality of HA user interface devices and the plurality of HA operation devices. A cloud server may be configured to communicate with the plurality of HA hub devices and determine a needed maintenance operation for a given one of the plurality of HA hub devices. The cloud server may also communicate the needed maintenance operation to the given one of the plurality of HA hub devices and duplicate communicating the needed maintenance operation to others of the plurality of HA hub devices.

A method aspect is directed to a method of communicating a needed maintenance operation in a HA system that includes a plurality of HA operation devices, a plurality of HA user interface devices for respective users, each HA user interface device configured to wirelessly communicate with at least one of the plurality of HA operation devices, and a plurality of HA hub devices configured to provide communications for the plurality of HA user interface devices and the plurality of HA operation devices. The method may include using a cloud server to communicate with the plurality of HA hub devices and determine a needed maintenance operation for a given one of the plurality of HA hub devices. The method may also include using the cloud server to communicate the needed maintenance operation to the given one of the plurality of HA hub devices and duplicate communicating the needed maintenance operation to others of the plurality of HA hub devices.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
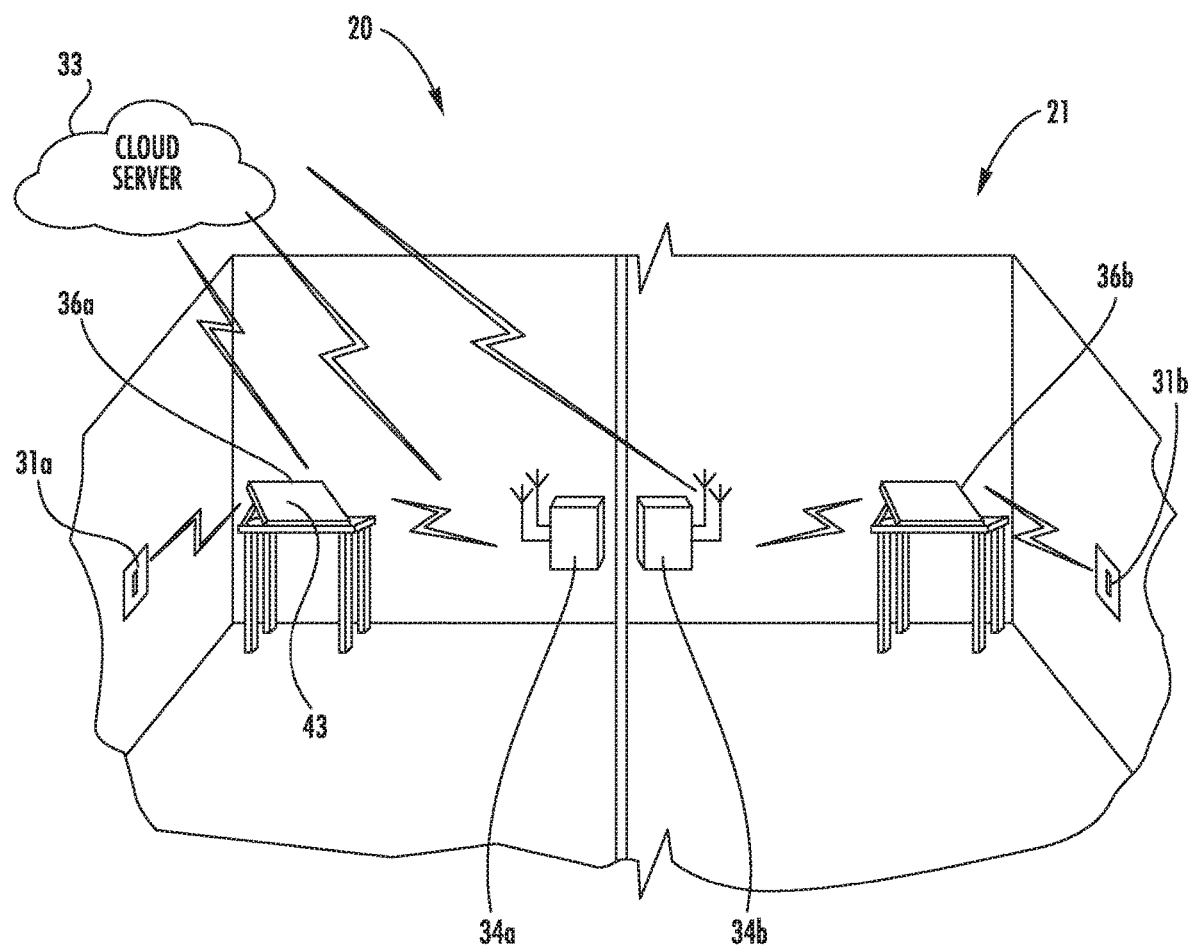
FIG. 1 is a diagram of a structure including an HA system according to an embodiment.
Figure 2:
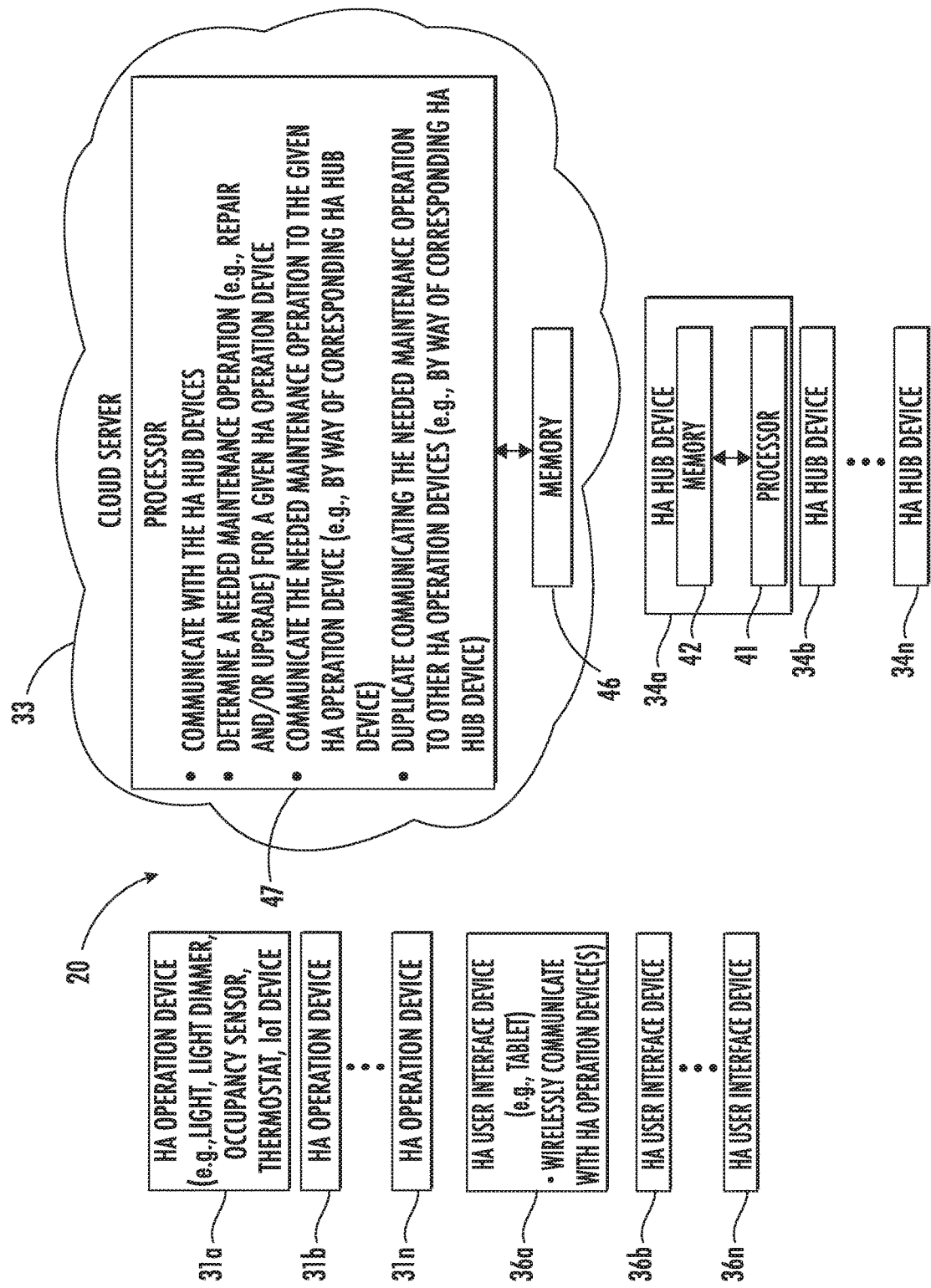
FIG. 2 is a schematic block diagram of an HA system according to an embodiment.

Referring initially to FIGS. 1 and 2, a home automation (HA) system 20 illustratively includes a cloud server 33. The cloud server 33 may store media content for distribution, for example, documents, photos, videos, data feeds, etc. The cloud server 33 may also process operations for HA devices. The cloud server 33 may also function as a gateway to permit operation of HA operation devices 31a-31n from outside a structure 21 or internal network (i.e., over the Internet).

The HA operation devices 31a-31n of the HA system 20 are within the structure 21. The structure 21 may be a senior living facility, for example, and include living rooms for members of the senior living facility. Of course, the structure 21 may be another type of structure, for example, a hospital, a home, a commercial, residential, and/or educational campus, etc.

The HA operation devices 31a-31n may include a light switch 31a in the room in the structure 21, a thermostat, a motion detector, an occupancy detector, an audio controller, a door lock, and a camera, for example. The HA operation devices 31a-31n may include other and/or additional types of devices.

The HA system 20 also includes HA user interface devices 36a-36n for respective users within the structure 21. The HA user interface devices 36a-36n may be in the form of tablet computers, for example. Each HA user interface device 36a-36n may be another or different type of HA user interface device, for example, a smartphone, a laptop or personal computer, and/or television interface or streaming device.

Each HA user interface device 36a-36n is configured to wirelessly communicate with at least one of the HA operation devices 31a-31n to perform at least one HA operation. For example, a given HA user interface device 36a may be used, based upon input thereto, to control the light switch 31a to thus control a light.

In the exemplary embodiment where an HA user interface device 36a-36n is in the form of a tablet computer, the HA user interface device may include a display 43, which may be in the form of a touch display permitting a user to control operation of one of the HA operation devices 31a-31n through interaction therewith. It should be understood that in some embodiments, the HA user interface devices 36a-36n may not include a touch display, but rather a physically separated display and an input device, such as, for example, a pushbutton. Each HA user interface device 36a-36n may also be used for social media, playing games, and/or surfing the Internet. Each HA user interface device 36a-36n may also provide stored media content to the respective user for listening and/or viewing on a display 43. In the example of a senior living facility, the stored media content may include current weather data, a social calendar, a daily food menu for the cafeteria, photos and/or video from a current event, local and national news, etc. Of course, each HA user interface device 36a-36n may be used to perform other and/or additional functions within the HA system 20.

The HA system 20 further includes HA hub devices 34a-34n within the structure or senior living facility 21. Each HA hub device 34a-34n includes a processor 41 and memory 42 coupled thereto. While functions or operations of the HA hub devices are described herein, it should be noted that these functions are performed by the processor 41 cooperating with the memory 42. The HA hub devices 34a-34n provide communications for the cloud server 33, the HA user interface devices 36a-36n, and the HA operation devices 31a-31n. More particularly, a respective HA hub device 34a-34n may be in each area of the structure 21 and communicate with a corresponding HA user interface device 36a-36n. With respect to the senior living facility example noted above, each member of the senior living facility may have an HA user interface device 36a-36n and an HA hub device 34a-34n within their room. The HA user interface device 36a-36n may communicate with the HA hub device 34a-34n to control respective HA operation devices 31a-31n. The HA hub device 34a-34n may be considered a bridge between respective HA operation devices 31a-31n and the corresponding HA user interface device 36a-36n.

An HA user interface device 36a-36n may communicate with the cloud server 33 to retrieve updated data or media content from the Internet, for example, or upload to the cloud server. Of course, the HA user interface device 36a-36n may communicate with either or both of the corresponding HA hub device 34a-34n and cloud server 33 to download or retrieve data and/or media. The HA user interface device 36a-36n may also upload data, for example, to the cloud server 33. With respect to the senior living facility example, the HA user interface device 36a-36n may upload or communicate usage data and/or other data, for example, cognitive data to be used by staff for determining a user health level and/or a user activity level. Further details of an exemplary HA system are described in U.S. Patent Application Publication No. 2017/0006533, assigned to the present assignee, and the entire contents of which are herein incorporated by reference.

As will be appreciated by those skilled in the art, like many computer components, elements of the HA system 20 may experience operational or maintenance issues that, continued operation, should be addressed. For example, a given HA operational device 31a-31n may become inoperative and/or a given HA hub device 34a-34n may be in need of an upgrade. This may happen, for example, when an HA operation device 31a-31n, which may be provided by and under operation of a third party manufacturer, may perform its own software upgrade, and thus, as a result communications with that the HA operation device may become inoperative. To address operational discontinuities, it may be desirable to perform certain maintenance operations or interventions, such as, for example, restarting software or services, installing updates, and/or rebooting. These maintenance operations may be performed by a local user or a remote support agent, and may be performed after a specific set of conditions are met.

Figure 3:
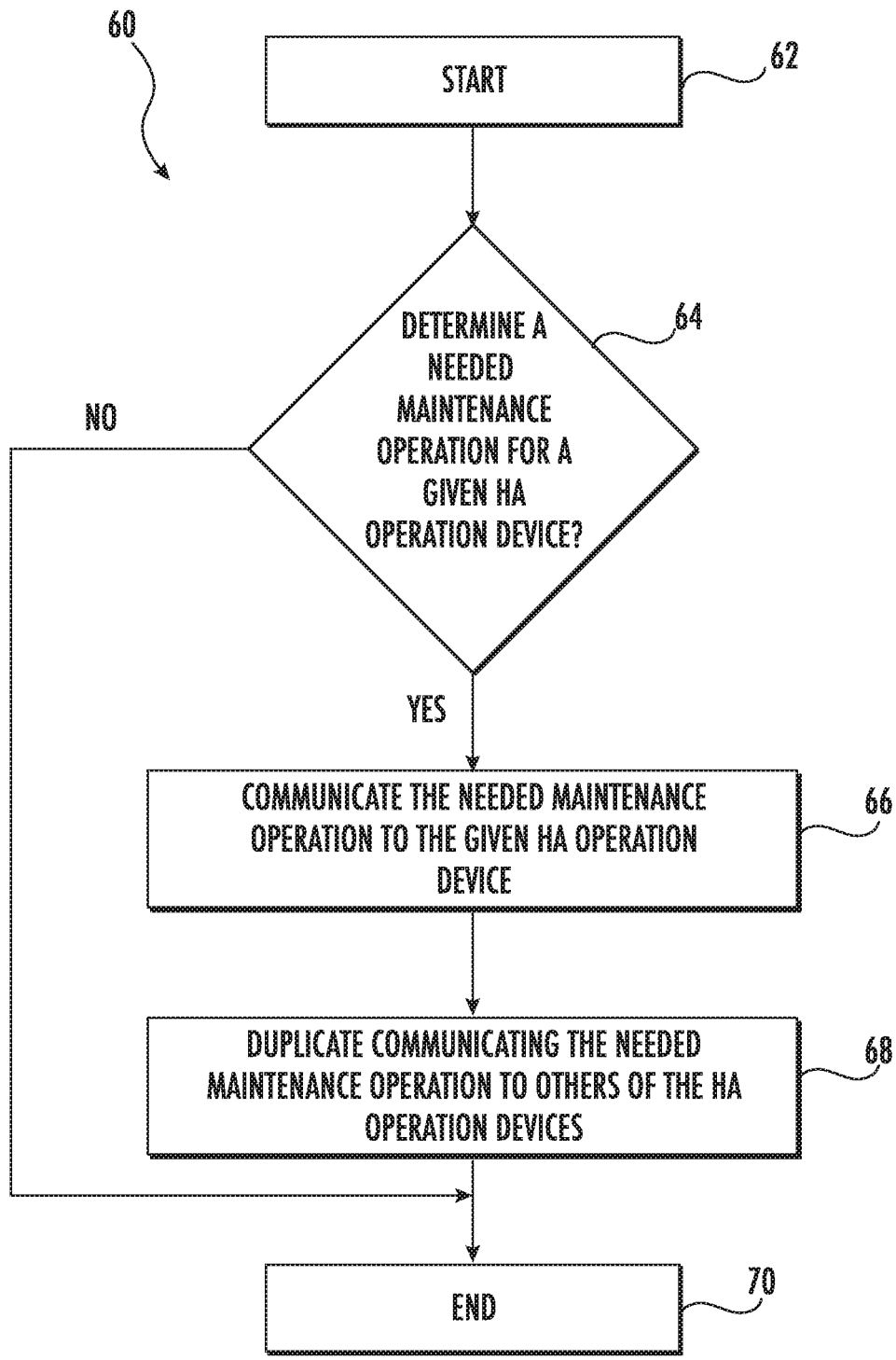
FIG. 3 is a flow diagram illustrating operation of the HA system of FIG. 2.

Referring now to the flowchart 60 in FIG. 3, beginning at Block 62, further details of exemplary maintenance operation for an HA operation device 31a-31n will now be described. At Block 64, the cloud server 33, which includes a memory 46 and a cloud server processor 47 coupled to the processor determines a needed maintenance operation for a given one of the HA operation devices 31a-31n. The cloud server 33 may determine that a maintenance operation, e.g., a repair or upgrade operation, is needed based upon communication with a corresponding HA hub device 34a-34n. For example, a virtual support agent, which may be equivalent to a hardware watchdog circuit, may be embedded or programmed within the HA hub device processor 41 of each HA hub device 34a-34n. The virtual support agent may monitor certain conditions. Exemplary conditions or symptoms to be monitored may include a state of an HA operation device 31a-31n (e.g., operational), respective states of different HA operation devices, and/or the state of the HA device processor 41 (e.g., percent usage). Of course, other and/or additional conditions may be monitored, as will be appreciated by those skilled in the art. If no maintenance operation is needed, the method ends at Block 70.

At Block 66, the cloud server 33, upon determining the needed maintenance operation at Block 64, communicates the needed maintenance operation to the given HA operation device 31a-31n. More particularly, the virtual support agent may communicate with the cloud server 33 for maintenance or intervention instructions (i.e., instructions as to how to address the maintenance issue) for the given HA operation device 31a-31n and based upon the communicated conditions or symptoms.

At Block 68, the cloud server 33 duplicates communicating the needed maintenance operation to other HA operation devices 31a-31n. For example, once the virtual support agent receives the needed maintenance operation or instructions from the cloud server 33, the virtual support agent or HA hub device processor 41 executes the needed maintenance operation for the corresponding HA operation device 31a-31n. If the needed maintenance operation is successful in addressing the maintenance issue, the virtual support agent may communicate the success of the maintenance operation to the cloud server 33. Based upon a successful maintenance operation, the cloud server 33 may communicate the needed maintenance operation to other HA operation devices 31a-31n by way of respective HA hub devices 34a-34n (e.g., virtual agents).

Accordingly, when another given HA operation device 31a-31n is in need of a maintenance operation, the respective HA hub device 34a-34n may execute the corresponding needed maintenance operation based upon the conditions monitored by the virtual agent. For example, when a virtual agent recognizes that a particular HA operation device 31a-31n is not operating, the virtual support agent may execute a reboot of that HA operation device. The reboot may have occurred as a result of a previous successful reboot with another HA operation device 31a-31n and HA hub device 34a-34n under similar conditions or symptoms. Of course, while the example of a non-operational HA operation device 31a-31n is described, it will be appreciated by those skilled in the art that the needed maintenance operation may be software update and/or may include other types of maintenance operations. The method ends at Block 70.

As will be appreciated by those skilled in the art, the virtual agent or each HA device hub processor 41 may be considered to have machine learning functionality. That is, as conditions, triggers, and corresponding successful needed maintenance operations are performed across the HA system 20, these are communicated to other HA hub devices 34a-34n across the HA system so that when a given HA hub device encounters similar conditions or symptoms, the corresponding virtual support agent can, for example, automatically, execute the corresponding needed maintenance operation without communicating with the cloud server 33 and/or without any manual intervention. The virtual agent may operate independent of other software running on the HA hub device processor 41. Example triggers may include amount of HA hub device memory remaining, lack of communication with HA operation devices 31a-31n, etc.

In one particular example, no activity was received from first and second motion detectors (i.e., HA operation devices 31a-31n) for over 12-hours. The needed maintenance determined was a restarting of a Z-Wave bridge (e.g., part of the HA hub device 34a-34n). Thus, the next time an HA hub device 34a-34n determines that two motion detectors are inactive for over 12-hours, the corresponding Z-Wave bridge would be restarted.

Figure 4:
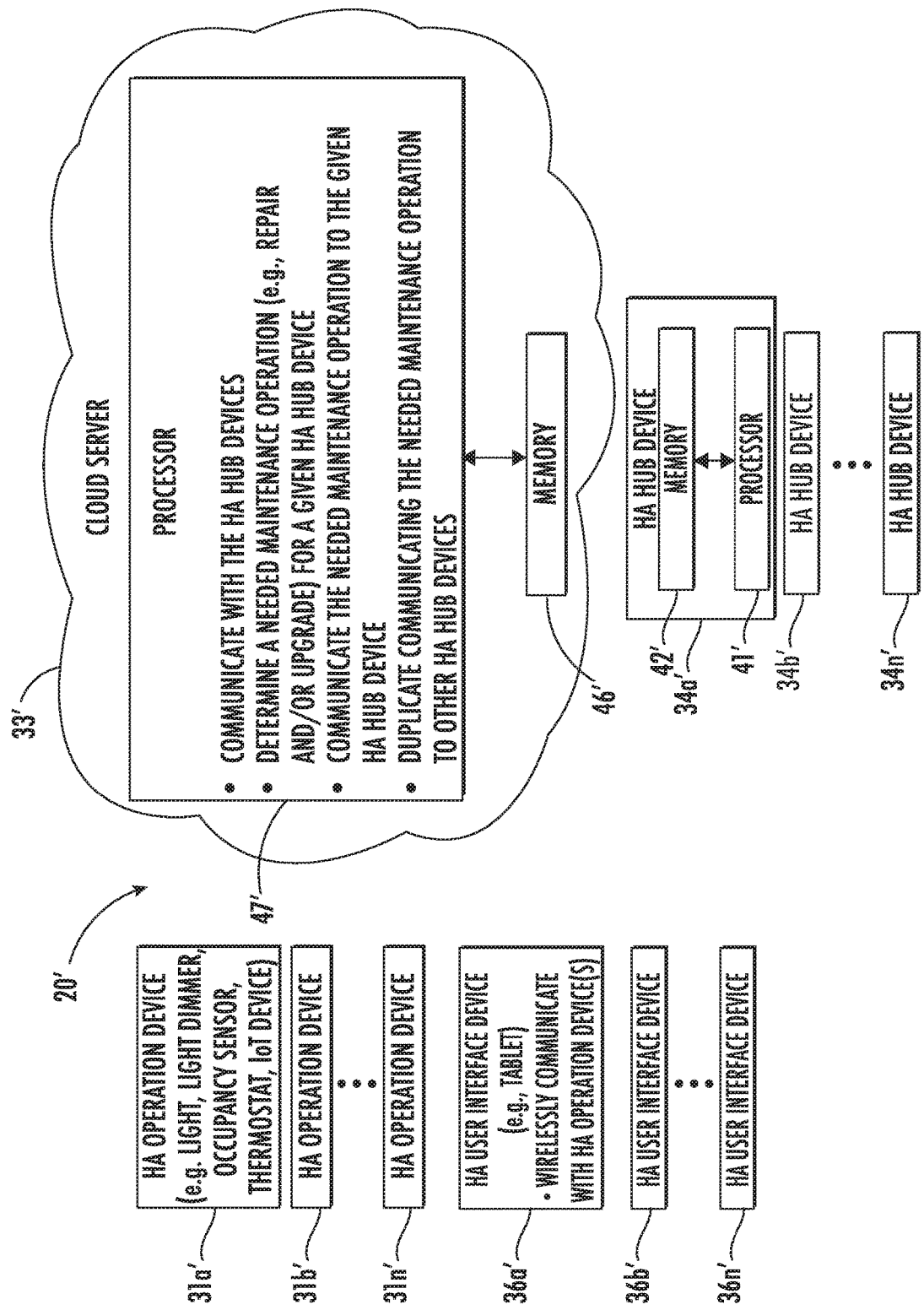
FIG. 4 is a schematic block diagram of an HA system according to another embodiment.
Figure 5:
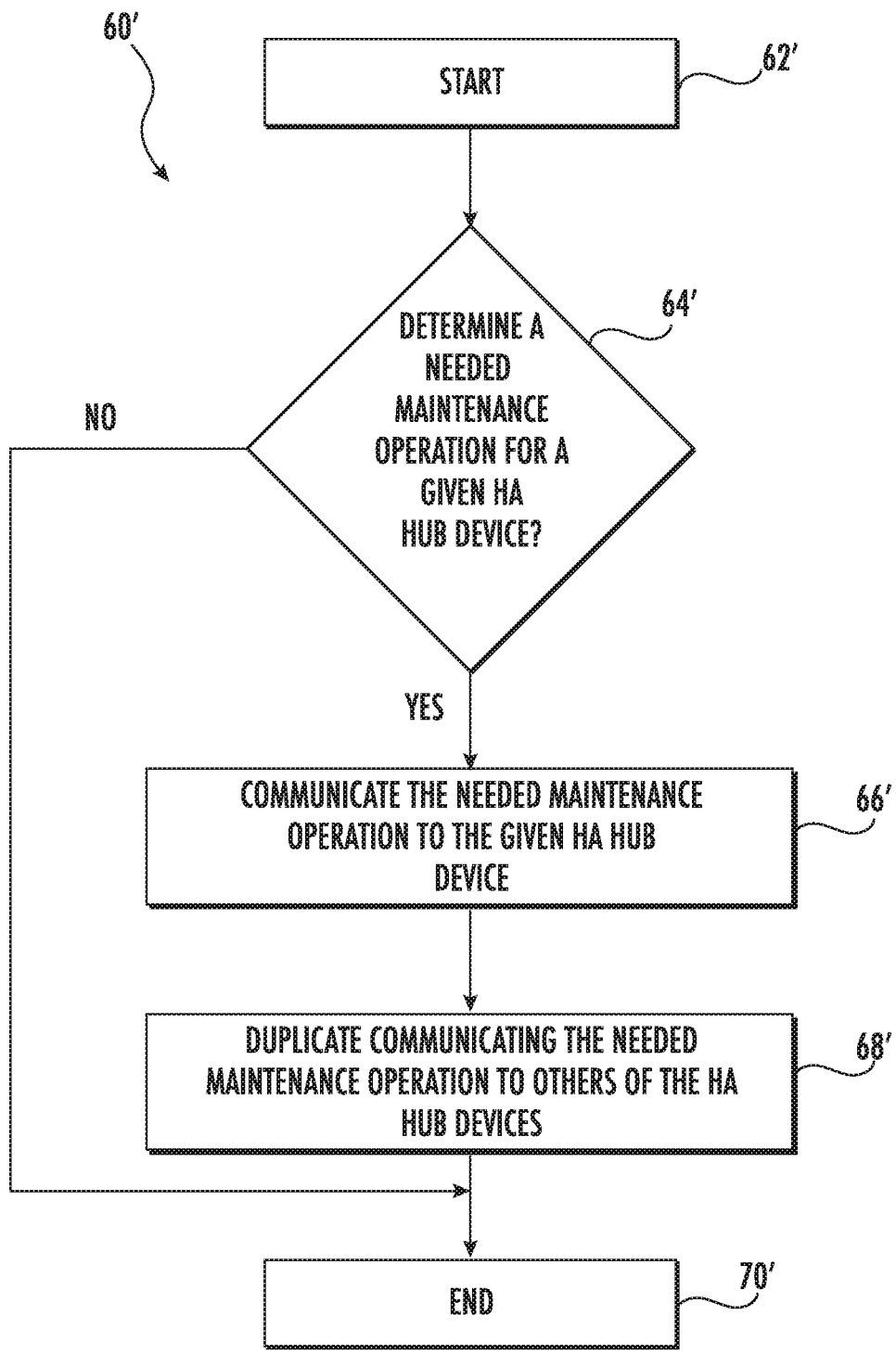
FIG. 5 is a flow diagram illustrating operation of the HA system of FIG. 4.

Referring now to FIG. 4 and the flowchart 60' in FIG. 5, beginning at Block 62', further details of exemplary maintenance operation for an HA hub device 34a' according to another embodiment will now be described. At Block 64', the cloud server 33' determines a needed maintenance operation for a given one of the HA hub devices 34a'-34n'. The cloud server 33' may determine that a maintenance operation, e.g., a repair or upgrade operation, is needed based upon communication with the corresponding HA hub device 34a'-34n'. Similar to the embodiments described above, a virtual support agent, which may be equivalent to a hardware watchdog circuit, may be embedded or programmed within the HA device processor 41' of each HA hub device 34a'-34n' and may communicate and monitor certain conditions. Exemplary conditions or symptoms to be monitored may include a state of an HA hub device 34a'-34n' (e.g., operational), percent HA hub device memory 42' usage, and/or the state of the HA hub device processor 41' (e.g., percent usage). Of course, other and/or additional conditions may be monitored, as will be appreciated by those skilled in the art. If no maintenance operation is needed, the method ends at Block 70'.

At Block 66', the cloud server 33', upon determining the needed maintenance operation at Block 64', communicates the needed maintenance operation to the given HA hub device 34a'-34n'. Similar to the embodiments described above, the virtual support agent may communicate with the cloud server 33' for maintenance or intervention instructions (i.e., instructions as to how to address the maintenance issue) for the given HA hub device 34a'-34n' and based upon the communicated conditions or symptoms.

At Block 68', the cloud server 33' duplicates communicating the needed maintenance operation to other HA hub devices 34a'-34n'. For example, once the virtual support agent receives the needed maintenance operation from the cloud server 33', the virtual support agent or HA hub device processor 41' executes the needed maintenance operation for itself. If the needed maintenance operation is successful in addressing the maintenance issue, the virtual support agent may communicate the success of the maintenance operation to the cloud server 33'. Based upon a successful maintenance operation, the cloud server 33' may communicate the needed maintenance operation to other HA hub devices 34a'-34n' (e.g., virtual agents).

Accordingly, when another given HA hub device 34a'-34n' is in need of a maintenance operation, the respective HA hub device may execute the corresponding needed maintenance operation based upon the conditions monitored by the virtual agent. For example, when a virtual agent recognizes that its HA hub device 34a'-34n' is not operating, the virtual support agent may execute a reboot of that HA hub device. The reboot may have occurred as a result of a previous successful reboot with another HA hub device 34a'-34n' under similar conditions or symptoms. Of course, while the example of a non-operational HA hub device 34a'-34n' is described, it will be appreciated by those skilled in the art that the needed maintenance operation may be software update and/or may include other types of maintenance operations.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A home automation (HA) system comprising:
   a plurality of HA operation devices;
   a plurality of HA user interface devices for respective users, each HA user interface device configured to wirelessly communicate with at least one of the plurality of HA operation devices; and
   a plurality of HA hub devices configured to provide communications for the plurality of HA user interface devices and the plurality of HA operation devices, and operate a virtual support agent to monitor operational states of the plurality of HA operation devices; and
   a cloud server configured to
      communicate with the virtual support agent of each of the plurality of HA hub devices to receive the operational states and learned corresponding successful maintenance operations for the plurality of HA operation devices,
      determine a needed maintenance operation for a given one of the plurality of HA operation devices based upon communication of a current corresponding operational state of a respective HA operation device from a respective virtual support agent of one of the plurality of the HA hub devices, and the operational states and learned corresponding successful maintenance operations,
      communicate the needed maintenance operation to the given one of the plurality of HA operation devices via a corresponding one of the plurality of HA hub devices, and
      duplicate communicating the needed maintenance operation to others of the plurality of HA operation devices via corresponding other virtual agents so that each other corresponding virtual agent executes the needed maintenance operation without manual intervention.

2. The HA system of claim 1 wherein the needed maintenance operation comprises a repair operation.

3. The HA system of claim 1 wherein the needed maintenance operation comprises an upgrade operation.

4. The HA system of claim 1 wherein the plurality of HA operation devices, the plurality of HA user interface devices, and the plurality of HA hub devices are within a structure.

5. The HA system of claim 4 wherein the structure comprises a senior living facility.

6. A cloud server for a home automation (HA) system comprising a plurality of HA operation devices, a plurality of HA user interface devices for respective users, each HA user interface device configured to wirelessly communicate with at least one of the plurality of HA operation devices, and a plurality of HA hub devices configured to provide communications for the plurality of HA user interface devices and the plurality of HA operation devices, and operate a virtual support agent to monitor operational states of the plurality of HA operation devices, the cloud server comprising:
   a memory and a processor cooperating therewith to
      communicate with the virtual support agent of each of the plurality of HA hub devices to receive the operational states and learned corresponding successful maintenance operations for the plurality of HA operation devices,
      determine a needed maintenance operation for a given one of the plurality of HA operation devices based upon communication of a current corresponding operational state of a respective HA operation device from a respective virtual support agent of one of the plurality of the HA hub devices, and the operational states and learned corresponding successful maintenance operations,
      communicate the needed maintenance operation to the given one of the plurality of HA operation devices via a corresponding one of the plurality of HA hub devices, and
      duplicate communicating the needed maintenance operation to others of the plurality of HA operation devices via corresponding other virtual agents so that each other corresponding virtual agent executes the needed maintenance operation without manual intervention.

7. The cloud server of claim 6 wherein the needed maintenance operation comprises a repair operation.

8. The cloud server of claim 6 wherein the needed maintenance operation comprises an upgrade operation.

9. A method of communicating a needed maintenance operation in a home automation (HA) system comprising a plurality of HA operation devices, a plurality of HA user interface devices for respective users, each HA user interface device configured to wirelessly communicate with at least one of the plurality of HA operation devices, and a plurality of HA hub devices configured to provide communications for the plurality of HA user interface devices and the plurality of HA operation devices, and operate a virtual support agent to monitor operational states of the plurality of HA operation devices, the method comprising:
   using a cloud server to
      communicate with the virtual support agent of each of the plurality of HA hub devices to receive the operational states and learned corresponding successful maintenance operations for the plurality of HA operation devices, determine a needed maintenance operation for a given one of the plurality of HA operation devices based upon communication of a current corresponding operational state of a respective HA operation device from a respective virtual support agent of one of the plurality of the HA hub devices, and the operational states and learned corresponding successful maintenance operations, communicate the needed maintenance operation to the given one of the plurality of HA operation devices via a corresponding one of the plurality of HA hub devices, and duplicate communicating the needed maintenance operation to others of the plurality of HA operation devices via corresponding other virtual agents so that each other corresponding virtual agent executes the needed maintenance operation without manual intervention.

10. The method of claim 9 wherein the needed maintenance operation comprises a repair operation.

11. The method of claim 9 wherein the needed maintenance operation comprises an upgrade operation.

12. A home automation (HA) system comprising:

a plurality of HA operation devices;

a plurality of HA user interface devices for respective users, each HA user interface device configured to wirelessly communicate with at least one of the plurality of HA operation devices; and a plurality of HA hub devices configured to provide communications for the plurality of HA user interface devices and the plurality of HA operation devices, and operate a virtual support agent; and a cloud server configured to communicate with the virtual support agent of each of the plurality of HA hub devices to receive operational states and learned corresponding successful maintenance operations for the plurality of HA hub devices, determine a needed maintenance operation for a given one of the plurality of HA hub devices based upon communication of a current corresponding operational state of a corresponding virtual support agent of a respective HA hub device, and the operational states and learned corresponding successful maintenance operations, communicate the needed maintenance operation to the virtual support agent of the given one of the plurality of HA hub devices, and duplicate communicating the needed maintenance operation to others of the plurality of HA hub devices via corresponding other virtual agents so that each other corresponding virtual agent executes the needed maintenance operation without manual intervention.

13. The HA system of claim 12 wherein the needed maintenance operation comprises a repair operation.

14. The HA system of claim 12 wherein the needed maintenance operation comprises an upgrade operation.

15. The HA system of claim 12 wherein the plurality of HA operation devices, the plurality of HA user interface devices, and the plurality of HA hub devices are within a structure.

16. The HA system of claim 15 wherein the structure comprises a senior living facility.

17. A cloud server for a home automation (HA) system comprising a plurality of HA operation devices, a plurality of HA user interface devices for respective users, each HA user interface device configured to wirelessly communicate with at least one of the plurality of HA operation devices, and a plurality of HA hub devices configured to provide communications for the plurality of HA user interface devices and the plurality of HA operation devices, and operate a virtual support agent, the cloud server comprising:

a memory and a processor cooperating therewith to communicate with the virtual agent of each of the plurality of HA hub devices to receive operational states and learned corresponding successful maintenance operations for the plurality of HA hub devices, determine a needed maintenance operation for a given one of the plurality of HA hub devices based upon communication of a current corresponding operational state of a corresponding virtual support agent of a respective HA hub device, and the operational states and learned corresponding successful maintenance operations, communicate the needed maintenance operation to the virtual support agent of the given one of the plurality of HA hub devices, and duplicate communicating the needed maintenance operation to others of the plurality of HA hub devices via corresponding other virtual agents so that each other corresponding virtual agent executes the needed maintenance operation without manual intervention.

18. The cloud server of claim 17 wherein the needed maintenance operation comprises a repair operation.

19. The cloud server of claim 17 wherein the needed maintenance operation comprises an upgrade operation.

20. A method of communicating a needed maintenance operation in a home automation (HA) system comprising a plurality of HA operation devices, a plurality of HA user interface devices for respective users, each HA user interface device configured to wirelessly communicate with at least one of the plurality of HA operation devices, and a plurality of HA hub devices configured to provide communications for the plurality of HA user interface devices and the plurality of HA operation devices, and operate a virtual support agent, the method comprising:

using a cloud server to communicate with the virtual support agent of each of the plurality of HA hub devices to receive operational states and learned corresponding successful maintenance operations for the plurality of HA hub devices, determine a needed maintenance operation for a given one of the plurality of HA hub devices based upon communication of a current corresponding operational state of a corresponding virtual support agent of a respective HA hub device, and the operational states and learned corresponding successful maintenance operations, communicate the needed maintenance operation to the virtual support agent of the given one of the plurality of HA hub devices, and duplicate communicating the needed maintenance operation to others of the plurality of HA hub devices via corresponding other virtual agents so that each other corresponding virtual agent executes the needed maintenance operation without manual intervention.

21. The method of claim 20 wherein the needed maintenance operation comprises a repair operation.

22. The method of claim 20 wherein the needed maintenance operation comprises an upgrade operation.

* * * * *